Feb. 8, 1927. 1,616,759
J. F. O'CONNOR
FRICTION SHOCK ABSORBING MECHANISM
Filed July 6, 1926 2 Sheets-Sheet 2
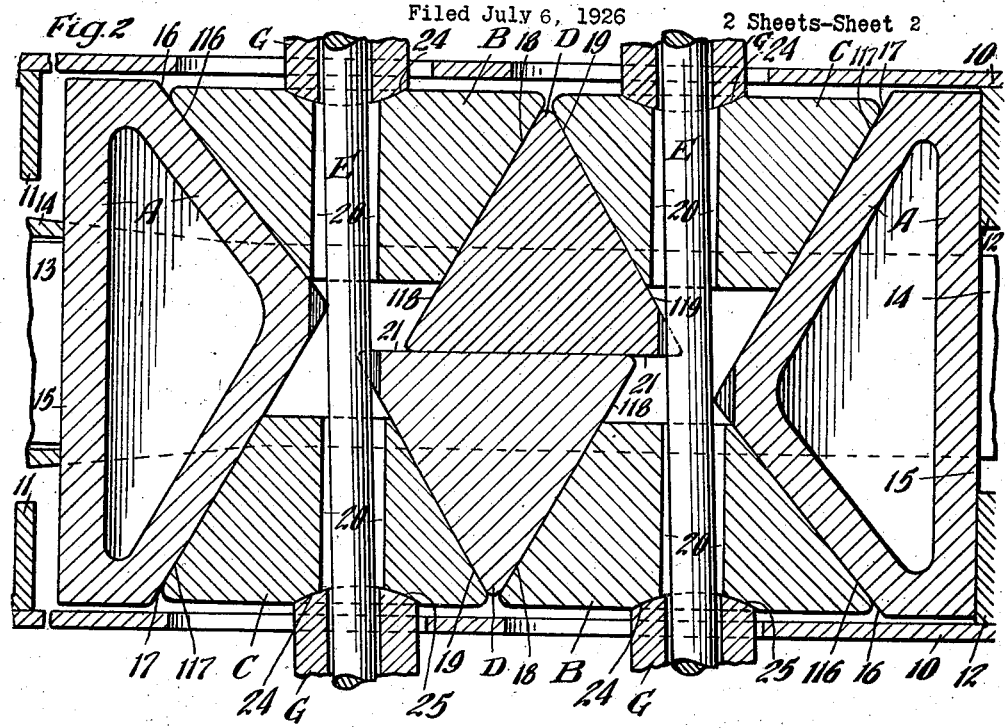
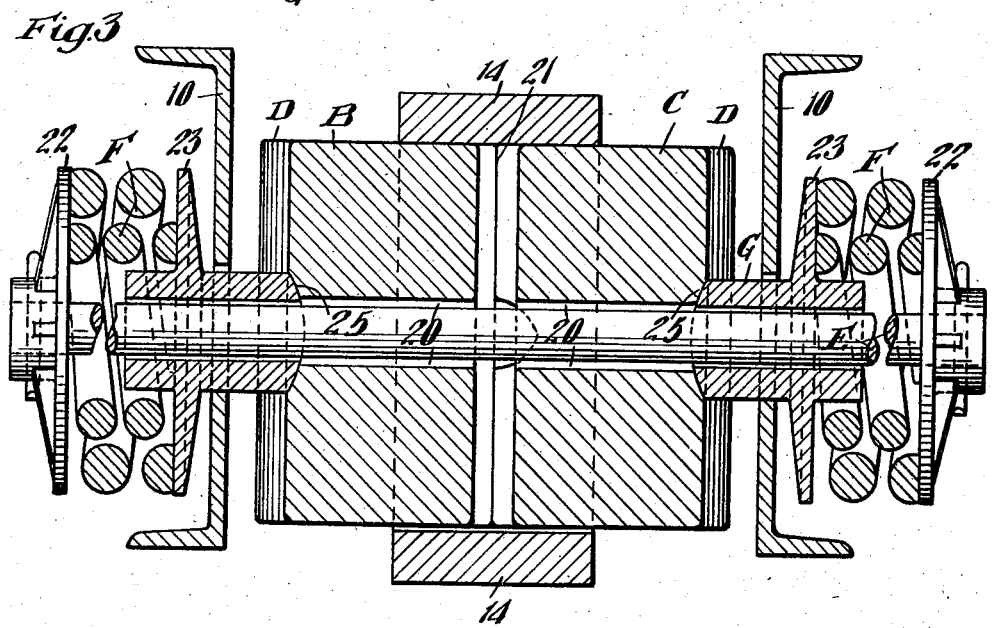
Witness
Wm. Geiger
Inventor
John F. O'Connor
By George I. Haight
his Atty.

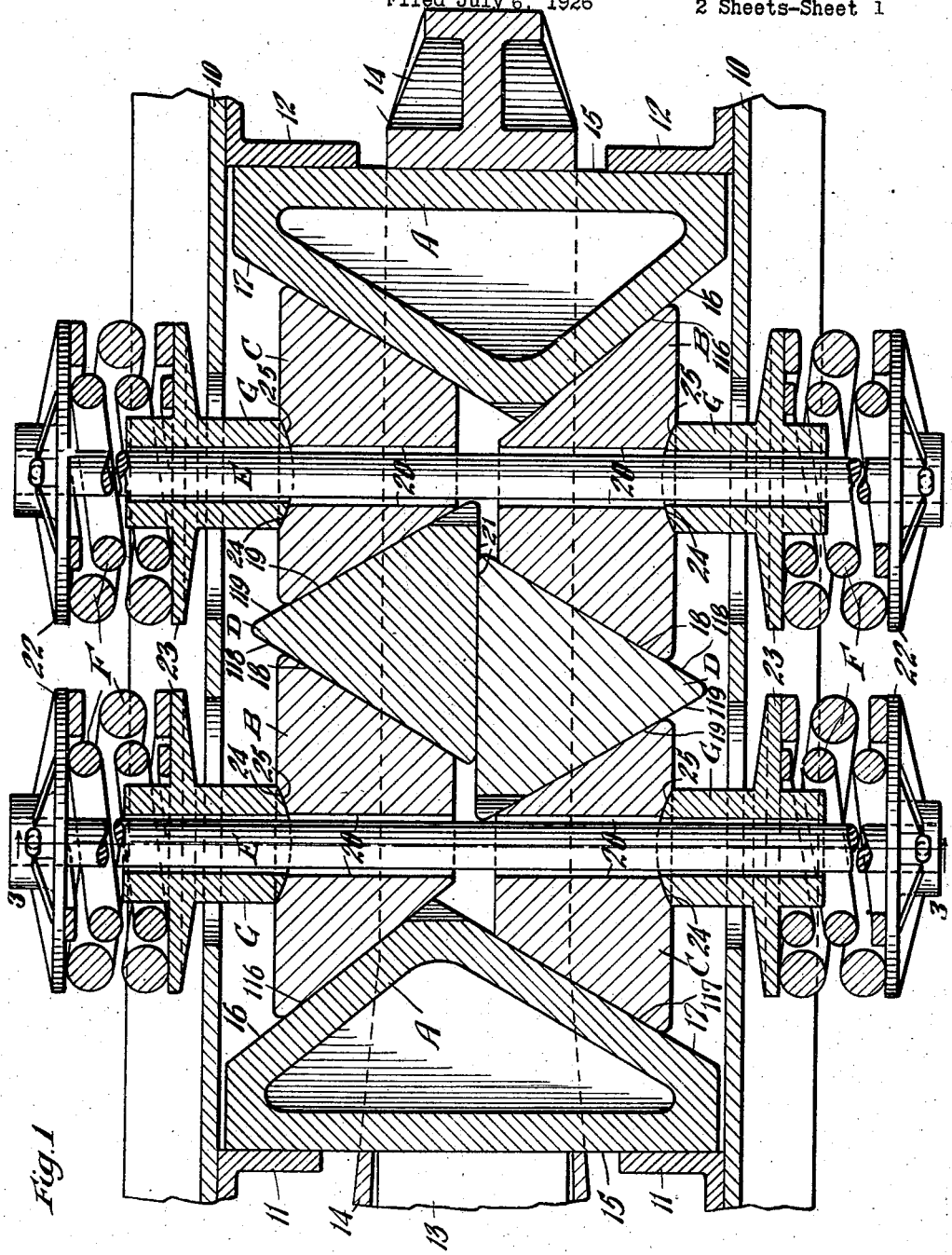

Patented Feb. 8, 1927.

1,616,759

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 6, 1926. Serial No. 120,776.

This invention relates to improvements in friction shock absorbing mechanism.

One object of the invention is to provide a friction shock absorbing mechanism especially adapted for railway draft riggings, including a plurality of relatively movable friction elements provided with a plurality of inter-engaging friction surfaces producing high frictional capacity.

Another object of the invention is to provide a friction shock absorbing mechanism of the character indicated, including a plurality of friction elements, certain of which have inter-engaging wedge friction surfaces arranged at different angles to provide relative movement of certain of the remaining elements to effect relative movement thereof on co-operating friction surfaces.

Other objects and advantages of the invention will more clearly and fully appear from the description and claims hereinafter following.

In the drawing, forming a part of this specification, Figure 1 is a horizontal, longitudinal, sectional view of a portion of a railway draft rigging showing my improvements in connection therewith. Figure 2 is a view similar to Figure 1, partly broken away, illustrating the position of the parts of the mechanism when fully compressed. And Figure 3 is a transverse, vertical, sectional view corresponding substantially to the line 3—3 of Figure 1.

In said drawings, 10—10 indicate channel-shaped center or draft sills of a railway car underframe, to the inner faces of which are secured front stop lugs 11—11 and rear stop lugs 12—12. The inner end portion of the drawbar is indicated by 13 to which is operatively connected a hooded yoke 14, the shock absorbing mechanism proper being supported within the yoke.

The shock absorbing mechanism proper comprises broadly: Front and rear follower acting wedge blocks A—A; two side members B—B; two side members C—C; two central combined wedge and friction blocks D—D; two retainer bolts E—E; two pairs of spring resistance elements F—F; and four spring followers or spools G—G.

The front and rear follower acting wedge blocks are in the form of hollow castings, each having a flat end face 15 co-operating with the corresponding stop lugs on the draft sills. On the inner side, each block A is provided with two inwardly converging wedge faces 16 and 17 at the opposite sides thereof. As clearly shown in the drawing, the wedge face 17 of each block A is disposed at a relatively blunter angle with reference to the longitudinal axis of the mechanism than the wedge face 16 thereof.

The side members B and C are arranged in pairs at opposite ends of the mechanism, the members of each pair being arranged at opposite sides of the mechanism. It will be noted that the member B of the front pair and the member C of the rear pair are arranged on the same side of the mechanism, while the members C and B of the front and rear pairs are arranged at the opposite side of the mechanism. The members B of the front and rear pairs are of identical design. Each of the members B has a pair of laterally inwardly converging wedge faces on the inner side thereof, one of the wedge faces being designated by 116 and the other by 18. The wedge face 116 of the member B is disposed at the same angle as the wedge face 16 of the corresponding follower block A and co-operates therewith. The wedge face 18 of the block B is preferably disposed at a blunter angle with reference to the longitudinal axis of the mechanism than the wedge face 116 thereof.

The wedge blocks C of the two pairs are also of identical design. Each wedge block C is provided with a pair of lateral inwardly converging wedge faces on the inner side thereof, one of the wedge faces being designated by 117 and the other by 19. The wedge face 117 is correspondingly inclined to the wedge face 17 of the corresponding follower acting block A and co-operates therewith. The remaining wedge face 19 of the block C is preferably disposed at the same angle with reference to the longitudinal axis of the mechanism as the wedge face 18 of the block B. As most clearly shown in Figure 1, the wedge blocks B and C of each pair are provided with aligned openings 20—20 adapted to accommodate the corresponding retainer bolt E.

The wedge blocks D are of similar design, each having a longitudinally disposed flat friction surface 21 on the inner side thereof, the friction surface 21 of the two blocks being in engagement. Each block D is also provided with a pair of laterally outwardly converging wedge faces 118 and 110

119 co-operating respectively with the wedge faces 18 and 19 of the side members B and C at the same side of the mechanism and correspondingly inclined thereto. As most clearly shown in Figure 1, the wedge blocks D are disposed substantially centrally of the mechanism and each of the blocks is interposed between the front and rear side members at the same side of the mechanism.

The spring resistance elements F are four in number and are arranged in pairs, each pair co-operating with one of the pairs of side members B and C. Each spring resistance element comprises a relatively light inner coil and a heavier and outer coil, the coils being interposed between a collar 22 fixed to the outer end of the corresponding retainer bolt E and a flange 23 on the spring follower spool G at the same side of the mechanism. Each spring follower spool G is provided with an opening adapted to freely accommodate the shank of the retainer bolt. The outer end of the spool projects beyond the flange 23 thereof and within the innermost coil of the spring resistance F, thereby holding the coils thereof properly centered. The spring follower spools extend through elongated openings in the draft sills, thereby permitting a certain amount of longitudinal movement of the same. At the inner end, each spring follower is provided with a spherical bearing surface 24 co-operating with a similar bearing seat 25 on the outer side of the corresponding side member. As most clearly shown in Figure 1, the openings 20 of the side members B and C are appreciably larger in diameter than the aligned openings of the spools G. The enlarged openings 20 permit a tilting movement of the retainer bolts, for a purpose hereinafter described.

The operation of my improved shock absorbing mechanism is as follows, during compression of the gear: The front and rear follower acting wedge blocks A will be moved relatively toward each other, thereby effecting separation of the side members B and C of the front and rear pairs. Separation of the side members B and C of each pair is resisted by the corresponding springs F. During the lateral separation of the side members, the faces 116 and 117 thereof will slip on the faces 16 and 17 of the follower acting blocks A, and the faces 18 and 19 thereof will slip on the faces 118 and 119 of the central wedge friction blocks D. It will be evident that due to the wedging action of the faces 18 and 19 of the side members B and C on the faces 118 and 119 of the blocks D, the latter will be pressed inwardly toward each other, thereby forcing the faces 21 into tight frictional engagement. Due to the difference in inclination of the faces 16 and 17 of the front and rear follower acting wedge blocks A, there will be a relative longitudinal movement of the side members B and C, together with the wedge friction block D at one side of the mechanism with reference to the side members B and C and the wedge friction block D at the opposite side of the mechanism. Relative longitudinal movement will thus be effected between the friction blocks D on the faces 21 thereof. Figure 2 illustrates the position assumed by the parts of the mechanism when the same is fully compressed, the side members being in their outermost position and the blocks D having been moved to the extent of their longitudinal travel. On account of the relative longitudinal movement of the side members, the openings 20 of the members of each pair will be brought out of exact alinement, thereby causing a slight tilting of the retainer bolt associated therewith. In order to permit of this tilting movement, the openings 20 are enlarged as heretofore pointed out. By providing the co-operating spherical bearing surfaces on the spools and side members, the tilting action of the bolts is compensated for, thereby preventing binding of the spools on the bolts. In release of the mechanism, the expansive action of the springs E causes the side members B and C of each pair to be forced inwardly toward each other, thereby moving the friction wedge blocks D to the full release position illustrated in Figure 1, and also forcing the front and rear follower acting wedge blocks to their outermost position.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with end followers; of a pair of side members co-operating with each end follower, each of the side members and the corresponding end follower having sets of co-operating wedge faces, the co-operating faces of one set being disposed at a different angle than the co-operating faces of the other set, whereby lateral and relative longitudinal movement of each pair of side members is effected; spring means resisting lateral movement of said side members; and a pair of wedge blocks co-operating with the side members, said wedge blocks having inter-engaging friction surfaces.

2. In a friction shock absorbing mechanism, the combination with end followers movable toward and away from each other; of side members co-operating with each follower, each side member having a wedge face co-operating with a similar wedge face on the corresponding end follower for effecting movement of said side members in directions away from each other, certain of said co-operating faces being disposed at a different angle than the remainder of said co-operating faces with respect to the longitudinal axis of the mechanism to effect relative movement of said members in another direction; wedge blocks co-operating with the side members associated with the front and rear end followers, said wedge blocks being moved relatively to each other by said side members, said wedge blocks having co-operating friction surfaces; and spring resistance means opposing movement of said side members away from each other.

3. In a friction shock absorbing mechanism, the combination with end followers movable toward and away from each other; of side members co-operating with each end follower, each of said side members having a wedge face co-operating with a similar wedge face on the corresponding end follower for effecting lateral movement of the side members, certain of said co-operating faces being disposed at a relatively keener angle with respect to the longitudinal axis of the mechanism than the remaining co-operating faces, whereby relative longitudinal movement of said side member associated with each follower is effected; means yieldingly opposing lateral movement of said side members; and wedge blocks co-operating with the side members associated with the front and rear end followers, said wedge blocks being moved relatively to each other by the side members during compression of the mechanism, said wedge blocks having co-operating friction surfaces.

4. In a friction shock absorbing mechanism, the combination with end followers movable toward and away from each other; of a plurality of wedge blocks having co-operating wedge faces, certain of said blocks having interengaging longitudinally disposed friction surfaces, and the remaining blocks having additional wedge faces co-operating with similar faces on said end followers, certain of said last named faces being disposed at a keener angle with respect to the longitudinal axis of the mechanism than the remainder of said faces; and spring means opposing movement of said wedge blocks during compression of the mechanism.

5. In a friction shock absorbing mechanism, the combination with front and rear followers each having a pair of wedge faces, one of the faces of each pair being disposed at a blunter angle with respect to the axis of the mechanism than the other face of said pair; of a pair of side members co-operating with each follower, each of said side members co-operating with one of the wedge faces of the corresponding follower; yielding means opposing lateral separation of the side members of each pair; and friction blocks interposed between said two pairs of side members, said blocks and side members having co-operating wedge faces; and said blocks having co-operating friction surfaces.

6. In a friction shock absorbing mechanism, the combination with front and rear followers; of a pair of central friction blocks having co-operating longitudinally disposed friction surfaces; pairs of front and rear side members, the side members of each pair being disposed at opposite sides of the mechanism, said side members being interposed between the friction blocks and followers, each of said side members having two wedge faces co-operating respectively with a similar face on one of the end followers and a similar face on one of the friction blocks, the co-operating wedge faces of each follower and the corresponding pair of side members being disposed at different angles with respect to the longitudinal axis of the mechanism; and yielding means opposing lateral separation of the side members of each pair.

7. In a friction shock absorbing mechanism, the combination with front and rear followers, each follower having a wedge face on each side thereof, the wedge faces of said front and rear followers at the same side of the mechanism being disposed at different angles with respect to the longitudinal axis of the mechanism; of a set of wedge blocks at each side of the mechanism interposed between said followers, the wedge blocks at each side of the mechanism having inter-engaging wedge faces, certain of said blocks at each side of the mechanism having wedging engagement with the wedge faces of said followers, and the remaining wedge blocks of said sets having co-operating friction surfaces; and spring means resisting relative movement of the blocks of said sets.

In witness that I claim the foregoing I have hereunto subscribed my name this 1st day of July, 1926.

JOHN F. O'CONNOR.